US008982843B2

(12) United States Patent
Lim et al.

(10) Patent No.: US 8,982,843 B2
(45) Date of Patent: Mar. 17, 2015

(54) WIRELESS COMMUNICATION SYSTEM AND METHOD FOR PERFORMING HANDOVER IN SUCH A SYSTEM

(75) Inventors: Chae Gwon Lim, Seoul (KR); Song Yean Cho, Seoul (KR); Sung Ho Choi, Suwon-si (KR); Beom Sik Bae, Suwon-si (KR); Han Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/700,559

(22) PCT Filed: Jun. 28, 2011

(86) PCT No.: PCT/KR2011/004720
§ 371 (c)(1),
(2), (4) Date: Nov. 28, 2012

(87) PCT Pub. No.: WO2012/002709
PCT Pub. Date: Jan. 5, 2012

(65) Prior Publication Data
US 2013/0070731 A1    Mar. 21, 2013

(30) Foreign Application Priority Data

Jun. 28, 2010    (KR) .................. 10-2010-0061344

(51) Int. Cl.
   *H04W 4/00*    (2009.01)
   *H04W 36/00*    (2009.01)
   *H04W 28/10*    (2009.01)
   *H04W 88/08*    (2009.01)
   *H04W 88/16*    (2009.01)

(52) U.S. Cl.
CPC .......... *H04W 36/0038* (2013.01); *H04W 36/00* (2013.01); *H04W 28/10* (2013.01); *H04W 88/08* (2013.01); *H04W 88/16* (2013.01)
USPC ......................................... 370/331; 370/328

(58) Field of Classification Search
None
See application file for complete search history.

(56) References Cited

U.S. PATENT DOCUMENTS

| 2007/0224993 | A1 | 9/2007 | Forsberg |
| 2010/0159932 | A1* | 6/2010 | Park et al. ...................... 455/436 |
| 2011/0070889 | A1* | 3/2011 | Li ................................. 455/436 |
| 2012/0163336 | A1* | 6/2012 | Adjakple et al. ............... 370/331 |

OTHER PUBLICATIONS

Yuh-Shyan Chen, et al. "A Secure Relay-Assisted Handover Protocol for Proxy Mobile IPv6 in 3GPP LTE Networks," WCNC 2010, Apr. 19, 2010.

* cited by examiner

*Primary Examiner* — Jae Y Lee
*Assistant Examiner* — Diane Lo
(74) *Attorney, Agent, or Firm* — Jefferson IP Law, LLP

(57) ABSTRACT

The present invention relates to a method and apparatus for performing handover in a wireless communication system, and the handover method of the present invention includes checking, when a Path Switch Request message associated with a terminal is received from a base station, whether a list of terminal security information values which has been saved exists; generating, when the list exists, a Path Switch Request acknowledge message including an unused terminal security information value selected form the list; and transmitting the Path Switch Request acknowledge message to the base station. Through this procedure, it is possible to reduce the terminal handover signal load generated by the base station.

10 Claims, 15 Drawing Sheets

WIRELESS COMMUNICATION SYSTEM AND METHOD FOR PERFORMING HANDOVER IN SUCH A SYSTEM

BACKGROUND OF THE INVENTION

1. Field of the Invention

The present invention relates to a method and apparatus for performing handover in a wireless communication system. In particular, the present invention relates to a method and apparatus for reducing the load of handover signals generated in the handover of a terminal.

2. Description of the Related Art

Mobile communication systems have developed to provide the subscribers with voice communication services on the move. With the advance of technologies, the mobile communication systems have been evolved to support high speed data communication services as well as the standard voice communication services. However, the mobile communication systems face resource shortage and user requirements for speed service and thus there is a need of more advanced mobile communication system.

In order to accomplish the requirements, the $3^{rd}$ Generation Partnership Project (3GPP) is standardizing Long Term Evolution (LTE) and LTE-Advanced (LTE-A) as one of the next generation mobile communication systems. LTE is a high speed packet-based communication technology aiming at the data rate of up to 100 Mbps and evolving to LTE-A to support advanced data rate of up to a few hundreds Mbps. Nevertheless, since the increase in number of terminals (User Equipment, UE) served by a base station increases and thus sharing the resource causes resource shortage, each UE may be served at very low data rate even though the system actually supports high packet transmission service. In order to solve this problem with the extension of service area and increase of network capacity, it is considered to introduce the deployment of a plurality of small size base stations, e.g., micro base station or pico base station having a small service area as compared to the legacy macro base station or femto cell having the service area limited to indoor use.

DISCLOSURE OF INVENTION

Technical Problem

However, the deployment of a plurality of small size base stations increases a number of handover of the UE abruptly. This causes the increase of handover signaling load and, as a consequence, requires extension of network facility and installation of additional equipment, resulting in increase of service charge. There is therefore a need of a method for overcoming this problem.

The present invention has been made in an effort solve the above problem and it is an object of the present invention to provide a method and apparatus for reducing the core network load caused by UE handover signals generated at the base station.

Solution to Problem

In accordance with an aspect of the present invention, a handover management method of a base station gateway processing signals between a mobility management entity and base stations includes checking, when a Path Switch Request message associated with a terminal is received from a base station, whether a list of terminal security information values which has been saved exists; generating, when the list exists, a Path Switch Request acknowledge message including an unused terminal security information value selected form the list; and transmitting the Path Switch Request acknowledge message to the base station.

In accordance with another aspect of the present invention, a wireless communication system for performing a handover includes a base station which transmits, when a handover complete message is received from a terminal, a path switch request message to request for sending the handover complete message and data addressed to the terminal to the base station; and a base station gateway which checks, when the path switch request message is received, whether a list of terminal security information values which has been saved exists, generates, when the list exists, a path switch request acknowledge message including an unused terminal security information value selected form the list, and transmits the path switch request acknowledge message to the base station.

Advantageous Effects

According to the present invention, an eNB gateway controls the handover occurring between the eNBs connected to the eNB gateway and blocks the transmission of the handover-related message addressed to the MME. As a consequence, it is reduce the load of the MME and on the communication link between the eNB gateway and the MME.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Although the description is directed to the LTE system, it will be understood by those skilled in the art that the present invention can be applied to other communication systems supporting the similar technical background and channel format with a slight modification without departing from the spirit and scope of the invention.

Figure 1:
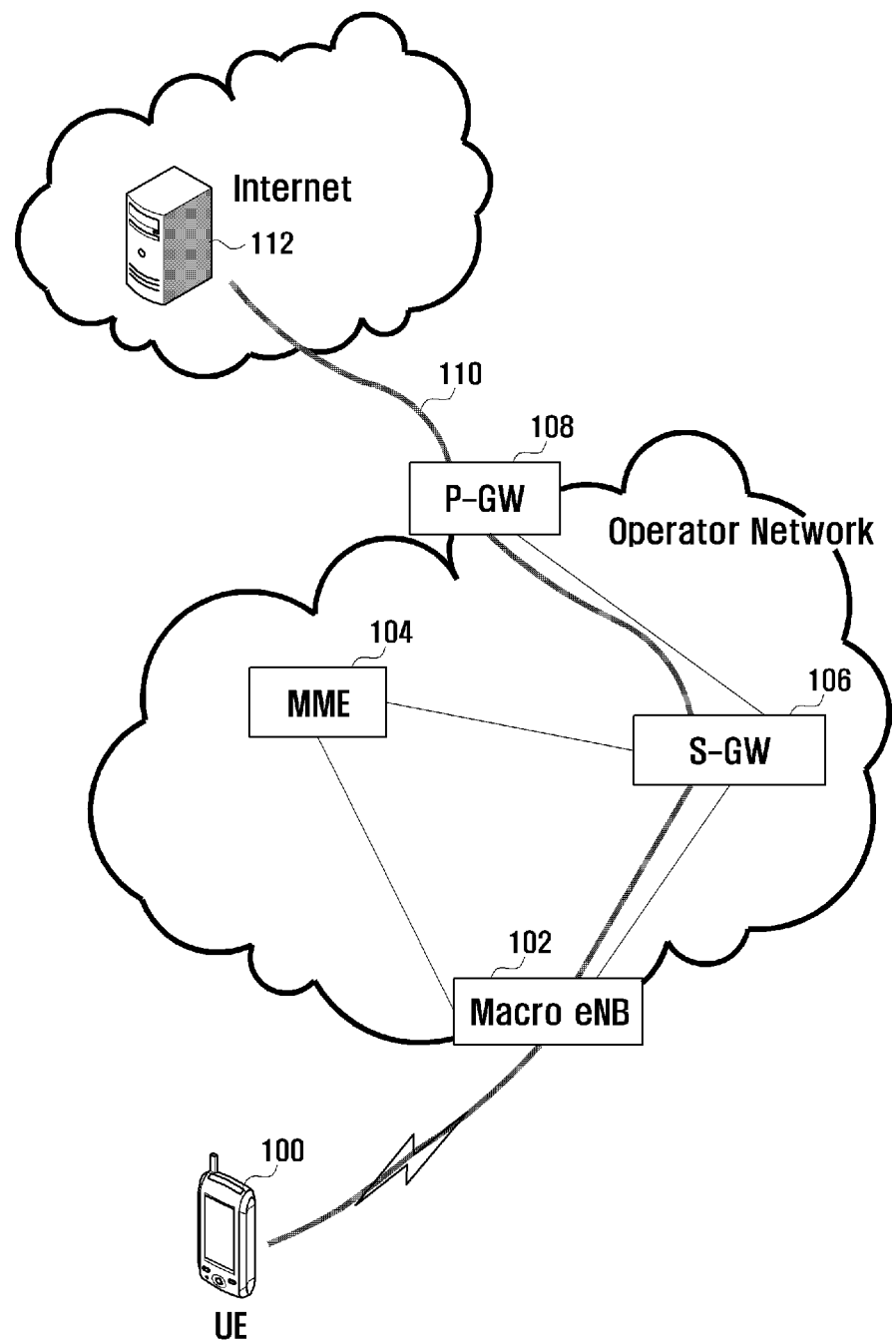
FIG. 1 is a diagram illustrating the architecture of a wireless communication system according to an embodiment of the present invention.

FIG. 1 is a diagram illustrating the architecture of a wireless communication system according to an embodiment of the present invention.

Referring to FIG. 1, the wireless communication network includes a User Equipment (UE) 100, a macro evolved Node B (macro eNB) 102, a Mobility Management Entity (MME) 104, a Serving Gateway (S-GW) 106, and a Packet Data Network Gateway (P-GW) 108.

When it has attached to the macro eNB 102, the UE 100 connects to the data network using the data transfer path 110 via the macro eNB 102, the S-GW 106, and the P-GW 108.

The macro eNB 102 manages is the eNB managing a macro cell. Here, the macro cell denotes a cell of a normal cellular system, and the macro eNB is the eNB managing and controlling the macro cell. For the convenience purpose, the terminal 'macro cell' and 'macro eNB' are used interchangeably and referred to as just eNB.

The eNB 102 is connected with the UE 100 through a radio channel and controls radio resource. For example, the eNB 102 generates and broadcasts system information including control information for UE's use in the macro cell. The eNB 102 is also capable of allocating radio resource to the UE 100 for communicating data and control information. At this time, the broadcast system information is capable of including Public Land Mobile Network ID (PLMN ID), EUTRAN Cell Global ID (ECGI), and Tracking Area ID (TAI). The eNB 102 make a handover decision based on the channel measurement result information of the serving and neighbor cells that is transmitted by UE 100. For this purpose, the eNB 102 is provided with control protocols such as Radio Resource Control Protocol.

The MME 104 manages the UE 100 in idle mode and selects the P-GW 108 and S-GW 106. The MME 104 is also responsible for roaming and authentication functions. The MME 104 also processes the bearer signal generated by the UE 100. Typically, the messages exchanged between the MME 104 and the UE 100 are called Non Access Stratum (NAS) messages.

The S-GW 106 works as a mobility anchor when the UE 100 performs handover between eNBs 102 or roams between 3GPP radio networks.

The P-GW 108 allocates Internet Protocol (IP) address to the UE 100 and performs packet data-related function of the core network. The P-GW 108 is also works as a mobility anchor for the UE 100 roaming between a 3GPP radio network and a non-3GPP radio network. The P-GW 108 also determines the bearer band for the subscriber and performs packet data forwarding and routing functions.

Typically, the eNB 102 and the MME 104 are connected through S1-MME interface, the eNB 102 and the S-GW 106 through S1-U interface, and S-GW 106 and P-GW 108 through S5 interface.

The wireless communication network may further include a Home Subscriber Server (HSS) (not shown). The HSS stores the subscription information of every UE. Accordingly, when the UE 100 attaches to the network, the HSS provides the MME 104 with the subscription information of the UE 100 in order for the MME 104 to control the UE 100.

In the wireless communication network, the UE establishes a connection to the eNB 102 and transmits a NAS request message to the MME 104. The NAS request message transmitted from the UE 100 to the MME 104 may be Attach Request, Tracking Area Update Request, or Service Request.

Figure 2:
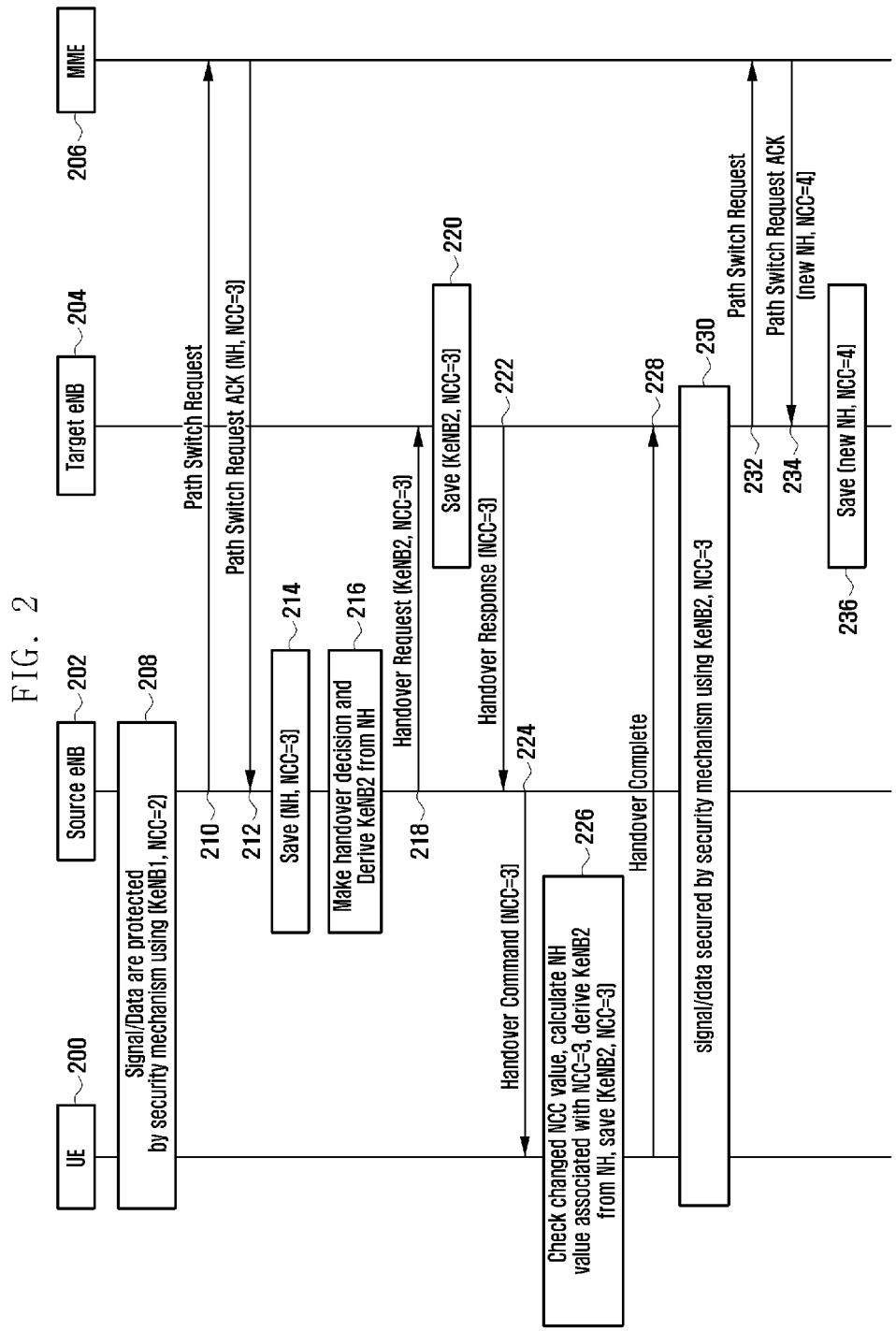
FIG. 2 is a signal flow diagram illustrating handover procedure of the UE in the 3GPP LTE wireless communication system.

FIG. 2 is a signal flow diagram illustrating handover procedure of the UE in the 3GPP LTE wireless communication system.

Referring to FIG. 2, the source eNB providing service between two UEs has a common security key of KeNB1 and a Next Chain Count (NCC) (here, it is assumed that NCC is set to 2) associated with the security key in the process of step 208. The UE 200 and the source eNB 202 communicate signal or data secured by these.

After completing a handover from an eNB (not shown) to the source eNB 202, the UE 200 notifies the source eNB 202 that the handover has completed. The source eNB 202 sends the MME 206 a Path Switch Request message to request the MME 206 to forward data addressed to the UE 200 to the source eNB 202 at step 210. Upon receipt of this message, the MME 206 sends to the S-GW 202 a Path Switch Request Acknowledge (ACK) including Next Hop (NH) and NCC (here, NCC=3) associated with NH.

The source eNB 202 stores the HN and NCC values transmitted by the MME 206 at step 214. Afterward, if the location of the UE 200 changes as time goes on, the source eNB 202 makes a handover decision for the UE 200 at step 216. Next, the source eNB 202 selects a target eNB 204 for the handover generates KenB2 as a security key to be used by the target eNB 204. At this time, the source eNB 202 derives the KeNB2 from NH value received from the MME 206 and the cell information (Physical cell ID and downlink frequency information) of the target eNB 204 at step 214.

Next, the source eNB 202 sends the target eNB 204 a Handover Request message including KeNB2 generated as the security key and the NCC=3 associated with NH value which has been used for generating the KeNB2 at step 218. Upon receipt of this message, the target eNB 204 saves the KeNB2 and NCC=3 transmitted by the source eNB 202 at step 220. Next, the target eNB 204 sends the source eNB 202 a Handover Response message including the replay indicating that the KeNB2 and NCC values have been saved at step 222. Here, the handover Response message includes NCC set to 3.

Afterward, the source eNB 202 sends the UE 200 a Handover command message including NCC=3 received from the target eNB 204 at step 224. Upon receipt of this message, the UE 200 compares the NCC=3 received from the source eNB 202 with the previously stored NCC=2 at step 226. At this time, if the NCC values mismatch, the UE 200 calculates the NH value associated with the NCC value received from the source eNB 202. Afterward, the UE 200 derives KeNB2 in consideration of the calculated NH value and the cell information (Physical cell ID and downlink frequency information) of the target eNB 204. Next, the UE 200 saves the generated KeNB2 and the NCC=3 received from the source eNB 202.

The UE 200 sends the target eNB 204 a Handover Complete message at step 228. At this time, the UE 200 and the target 204 save KeNB2 as the common Security key and the Next Chain Count (NCC) value associated with KeNB2 at step 230. Next, the UE 200 and the target eNB 204 communicate signals or data secured by means of the security mechanism using the NCC=3 associated with KeNB2.

The target eNB 204 notifies of the completion of the handover at step 232. Next, the target eNB 204 sends the MME 206 a Path Switch Request message to request for transmitting the data addressed to the UE 200 to the target eNB 204. Upon receipt of this message, the MME 206 sends the target eNB 204 a Path Switch Request Ack message including a new Next Hop (NH) as the UE security information and a NCC (here, NCC=4) associated with the NH at step 234. The target eNB 204 saves the NH and NCC=4 received from the MME 206 at step 236.

Figure 3:
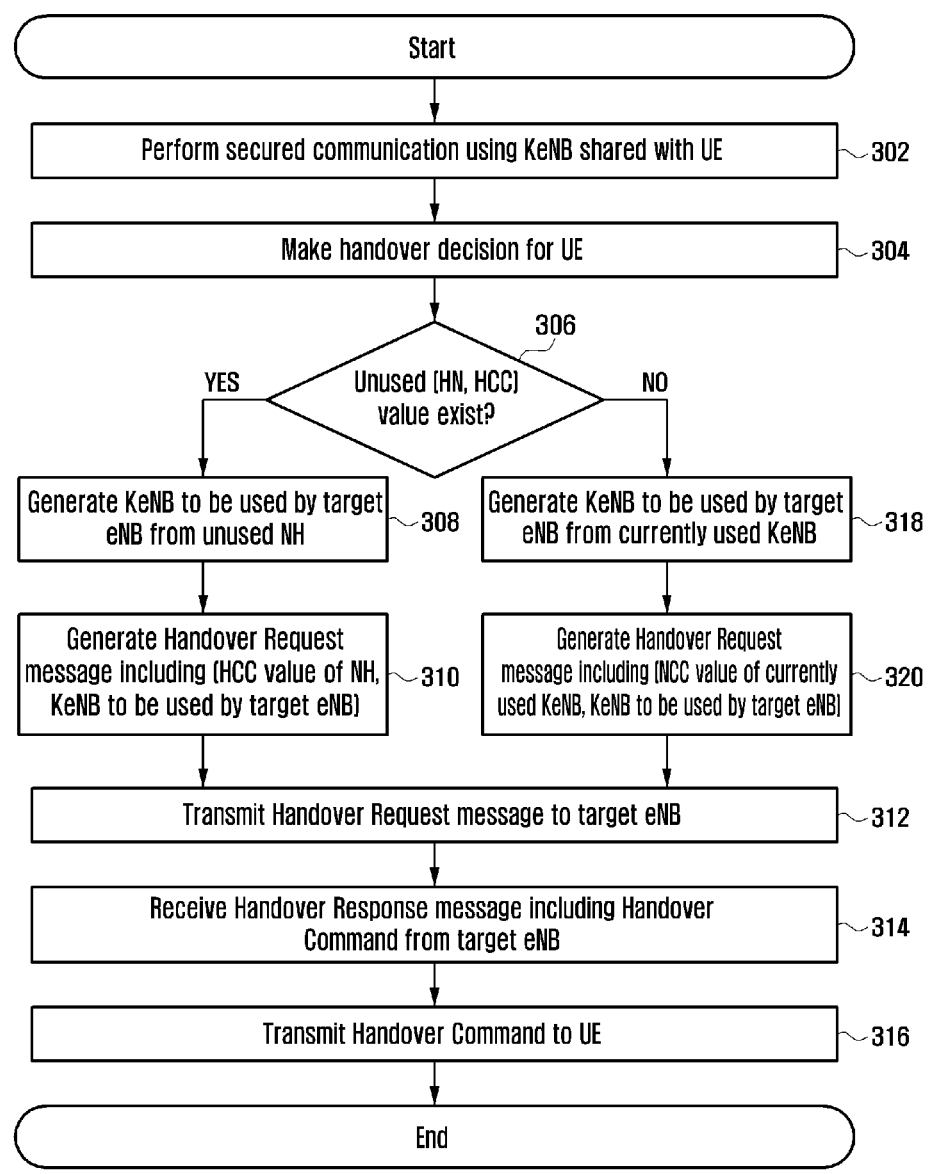
FIG. 3 is a flowchart illustrating the operating procedure of the source eNB according to the present invention.

FIG. 3 is a flowchart illustrating the operating procedure of the source eNB according to the present invention.

Referring to FIG. 3, the source eNB 202 is performing secured communication with the UE 200 using KeNB as the common security key at step 302. In this state, the source eNB 202 makes a handover decision for the UE 200 according to the movement of the UE 200 at step 204. Next, the source eNB 202 checks where there are unused NH and NCC values saved but not used at step 306.

If there are unused NH and NCC values, the source eNB 202 generates KeNB as the security key to be used by the target eNB 204 in consideration of the saved NH value and the cell information (Physical cell ID and downlink frequency information) of the target eNB 204 at step 308. Afterward, the source eNB 202 generates, at step 310, a handover request message including the NCC value associated with NH value and the KeNB value generated at step 308. The source eNB 202 sends the handover request message to the target eNB 204 at step 312 and receives the handover response message including the handover command addressed to the UE 200 at step 314 from the target eNB 204. Afterward, the source eNB 202 delivers the handover command message to the UE at step 316.

Otherwise, if there are no unused NH and NCC values at step 306, the source eNB 202 generates KeNB to be used by the target eNB 204 from the currently used KeNB in consideration of the cell information (Physical cell ID and downlink frequency information) of the target eNB 204 at step 318. Next, the source eNB 202 generates, at step 320, a handover request message including the NCC value associated with the currently used KeNB and the KeNB value of the target eNB 204 which has been generated at step 318 and then performs the operations of steps 312 to 316.

Figure 4:
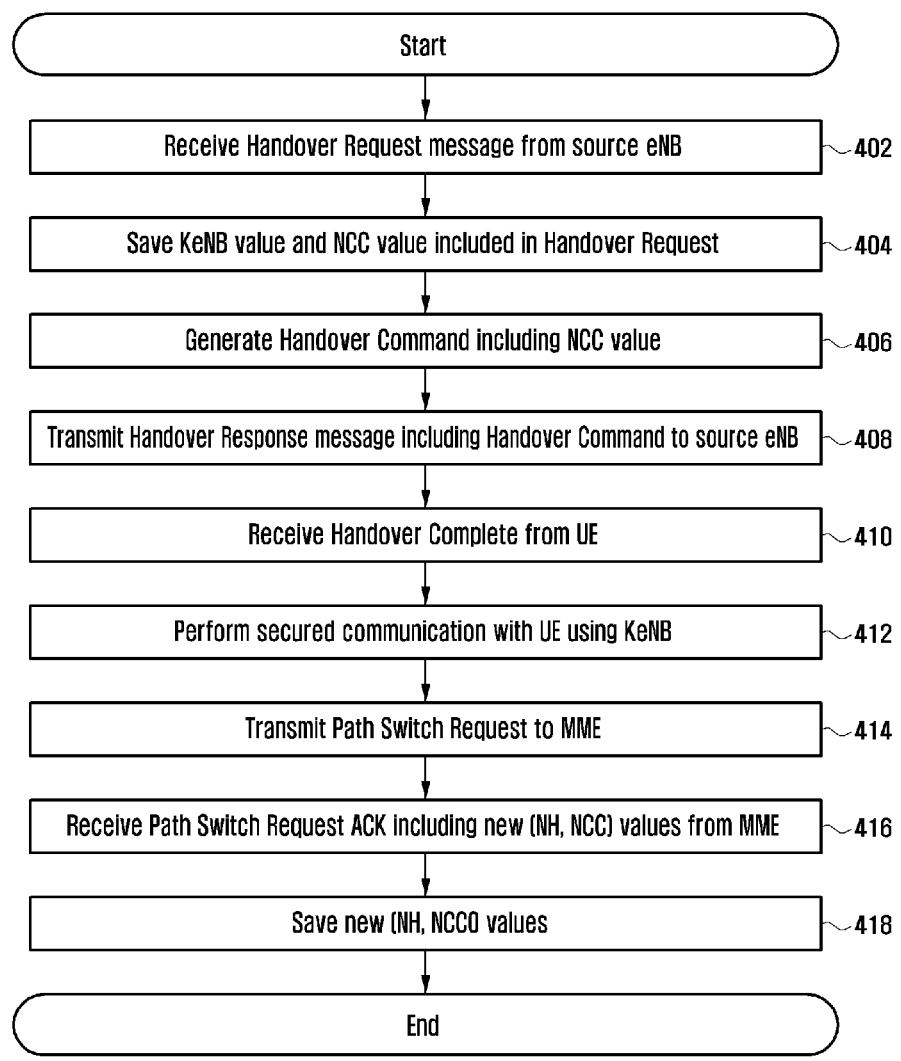
FIG. 4 is a flowchart illustrating the operating procedure of the target eNB according to the present invention.

FIG. 4 is a flowchart illustrating the operating procedure of the target eNB according to the present invention.

Referring to FIG. 4, the target eNB 204 receives a Handover Request message from the source eNB 202 at step 402 and saves KeNB and NCC value associated with KeNB that are included in the Handover Request message at step 404. Afterward, the target eNB 204 generates a Handover Command message including NCC value at step 406. Next, the target eNB 204 delivers a Handover Response message including the Handover Command to the source eNB 202 at step 408.

Afterward, the target eNB 204 receives a Handover Complete message from the UE 200 at step 410 and starts Secured communication with the UE 300 using the saved KeNB at step 412. Next, the target eNB 204 sends the MME 206 a Path Switch Request message to notify of the handover completion for the UE and request for transmitting the data addressed to the UE 200 to the target eNB 204 at step 414. The target 204 receives a Path Switch Request Ack message including new NH and NCC values from the MME at step 416. Next, the target eNB 204 saves the HN and NCC values included in the Path Switch Request ACK message received from the MME 206 at step 418.

Figure 5:
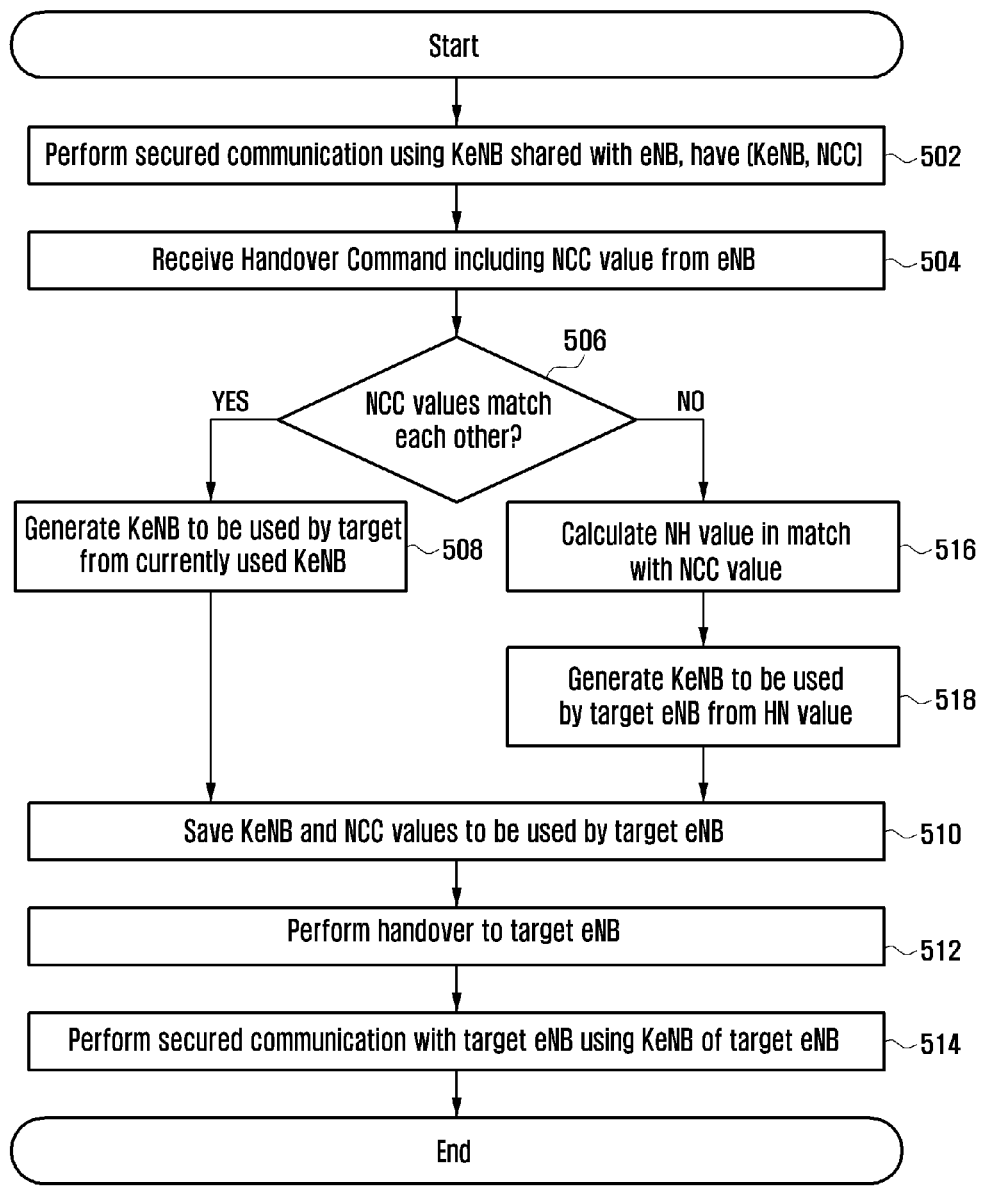
FIG. 5 is a flowchart illustrating the operating procedure of the UE according to the present invention.

FIG. 5 is a flowchart illustrating the operating procedure of the UE according to the present invention.

Referring to FIG. 5, the UE 200 is performing secured communication with the source eNB 202 using the KeNB as the security key shared with the source eNB 202 at step 502. In this state, the UE 200 has the KeNB and the NCC associated with the KeNB that are currently used. The UE 200 receives a Handover Command message including the NCC value from the source eNB 202 at step 504 and compares the received NCC value with the previously stored NCC value to determine whether the NCC values match each other at step 506.

If the received NCC value is equal to the previously stored NCC value, the UE 200 generates KeNB as the security key to be used by the target eNB 204 in consideration of the cell information (Physical cell ID and downlink frequency information) of the target eNB 204 at step 508. Here, the cell information of the target eNB 204 is transmitted in the Handover Command message.

The UE 200 saves the KeNB value and the NCC value for use by the target eNB 204 at step 510. Next, the UE 200 performs handover to the target eNB 204 at step 512. Finally, the UE 200 performs secured communication with the target 204 using the KeNB of the target 204.

If the received NCC value differs from the previously stored NCC value at step 506, the UE 200 calculates, at step 516, the NH value in match with the NCC value received at step 504. Next, the UE 200 generates the KeNB as the security key for use by the target eNB 204 in consideration of the calculated HN value and the cell information (Physical cell ID and downlink frequency information) of the target eNB 204 and then performs steps 510 to 514.

The present invention has been conceived to solve the problem of the too frequent handover and handover signaling overload caused by the deployment of large number of small size eNBs. That is, the present invention aims to provide a method and apparatus for reducing the core network overload caused by the UE handover signals generated by the eNBs.

Figure 6:
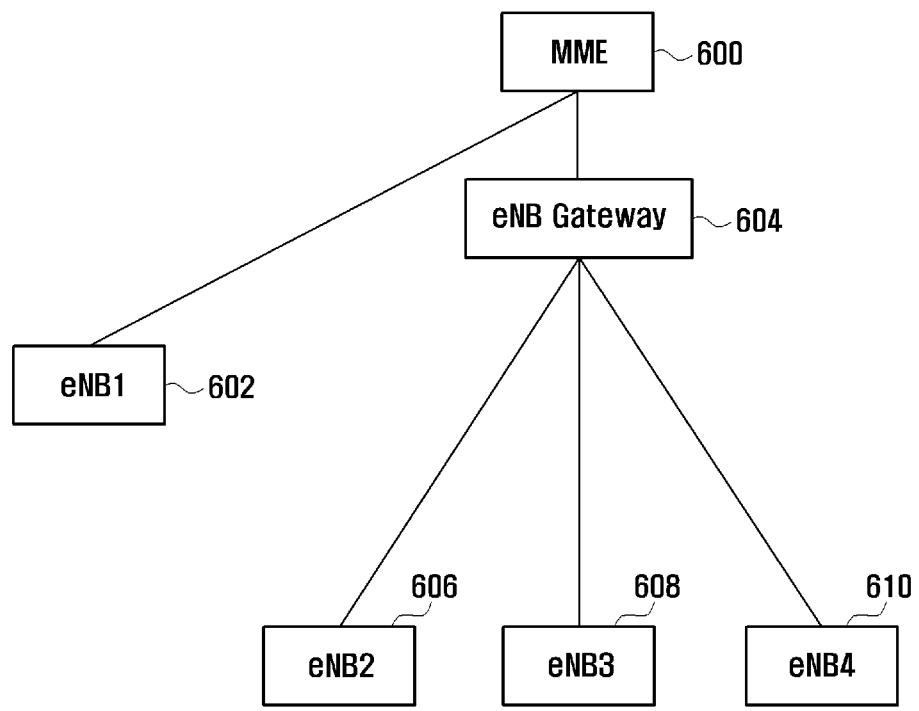
FIG. 6 is a diagram illustrating the architecture of the wireless communication system according to an embodiment of the present invention.

FIG. 6 is a diagram illustrating the architecture of the wireless communication system according to an embodiment of the present invention.

Referring to FIG. 6, unlink the normal connection between the MME 600 and the eNB1 602 for direct communication, the present invention proposes introduction of an eNB gateway 604 which interposes between the MME 600 and a plurality of eNBs 606, 608, and 610.

The eNB gateway 604 is responsible for delivering the signals between the MME 600 and the eNBs 606, 608, and 610. The eNB gateway 604 also saves the NH and HCC values as the UE security information transmitted from the MME 600 to the eNBs 606, 608, and 610. The eNB gateway 604 controls the handover occurring among the eNBs 606, 608, and 610 so as to block the handover-related message transmission to the MME 600. This is capable of reducing the load of the MME 600 and the load on the communication link between the eNB gateway 604 and the MME 600.

Figure 7:
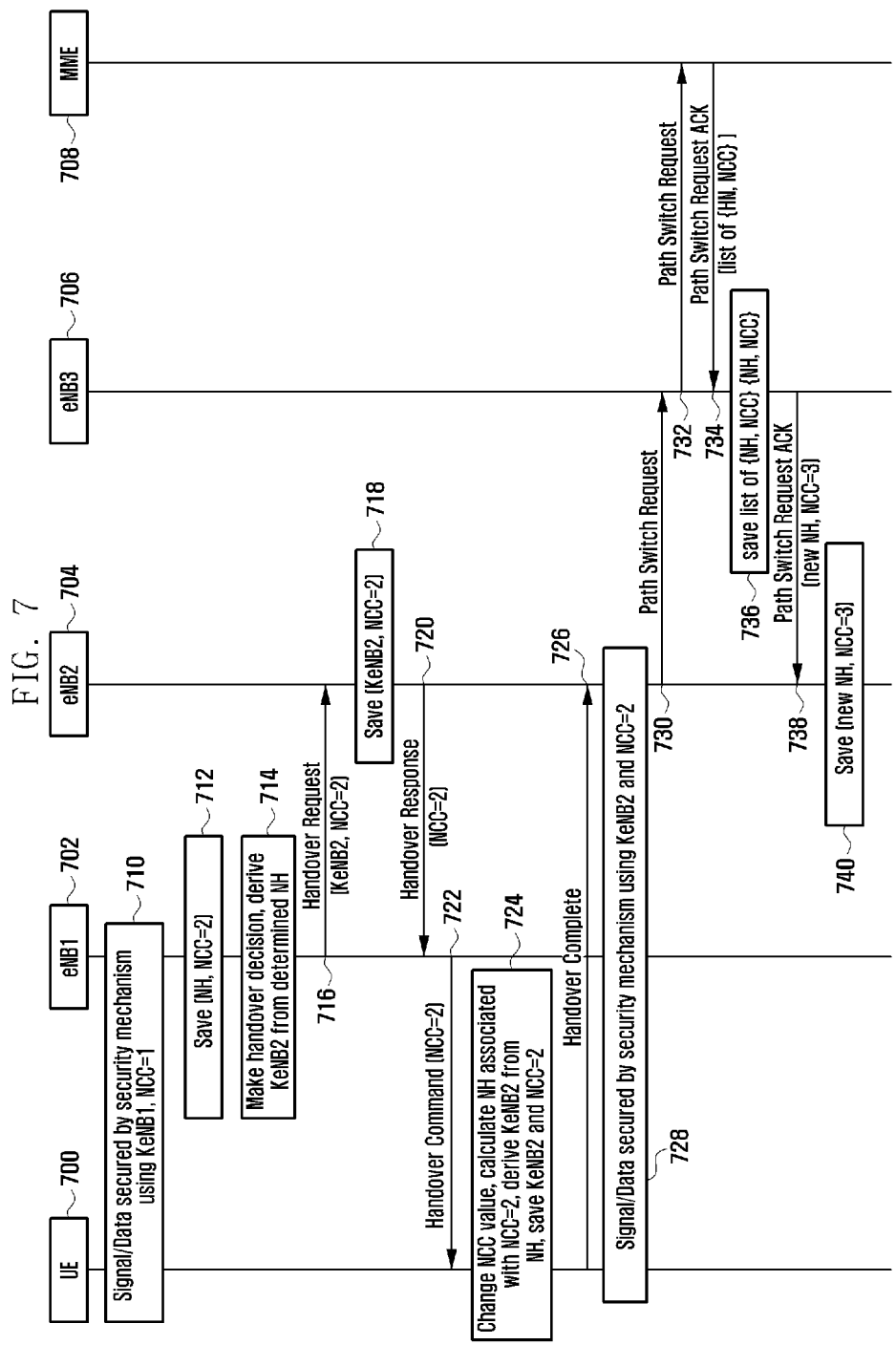
FIG. 7 is a signal flow diagram illustrating the handover procedure with the eNB gateway according to the first embodiment of the present invention.

FIG. 7 is a signal flow diagram illustrating the handover procedure with the eNB gateway according to the first embodiment of the present invention.

FIG. 7 is directed to the case where the eNB gateway 604 saves the UE-related security information list in the handover of the UE 700 from the eNB 702 (hereinafter, referred to as eNB1) not connected to the eNB gateway 706 to the eNB 704 (hereinafter, referred to as eNB2) connected to the eNB gateway 604.

Referring to FIG. 7, the UE 700 and eNB1 702 are in communication using KeNB1 and NCC=1 at step 710. At this time, the eNB1 702 saves NH and NCC=2 at step 712. Next, the eNB1 702 makes a handover decision according to the change of the location of the UE 700 at step 714. The eNB1 702 selects the eNB2 704 as the target eNB and then generates KeNB2 in consideration of the NH value saved at step 712 and the cell information (Physical cell ID and downlink frequency information) of the eNB2 704.

The eNB 702 sends the eNB2 704 a Handover Request message including the KeNB2 as the newly generated security key and the NCC=2 associated with the NH value used for generating the KeNB2 at step 716.

Upon receipt of this message, the eNB 2 704 saves the KeNB2 value and NCC value transmitted by the eNB1 702 at step 718. Next, the eNB2 704 sends the eNB1 702 a Handover Response message including the saved NCC value at step 720. The eNB1 702 sends the UE 700 the Handover Command including the NCC value which has been transmitted by the eNB2 704 at step 722.

The UE 700 compares the NCC value transmitted by the eNB1 702 with the previously stored NCC value at step 724. Here, since the NCC value transmitted by the eNB1 702 is 2 and the previously stored NCC value is 1, the UE 700 calculates NH value in association with the NCC value transmitted by the eNB1 702. Next, the UE 700 generates KeNB2 in consideration of the HN value and the cell information (Physical cell ID and downlink frequency information) of the eNB2 704. Next, the UE 700 saves the generated KeNB2 and the NCC=2 transmitted by the eNB1 702.

The UE 700 sends the eNB2 704 a Handover Complete message at step 726. At this time, the UE 700 and the eNB2 704 save the KeNB2 as the common security key and the NCC=2 associated with the security key at step 728. Next, the UE 700 and the eNB2 704 perform secured signaling or data transmission using the KeNB2 as the security key.

The eNB2 704 sends the eNB gateway 706 a Path Switch Request message to request for handover completion and transmission of the data addressed to the UE 700 to the eNB2 704 at step 730. The eNB gateway 706 delivers the Path Switch Request message transmitted by the UE 700 to the MME 708 at step 732. The MME 708 sends the eNB gateway 706 a Path Switch Request ACK message including the new NH as the UE security information and a list of the NCC values associated with the HN at step 734. Afterward, the eNB gateway 706 saves the NH and NCC value list transmitted by the MME 708 at step 736. Next, the eNB gateway 706 sends the eNB2 704 a Path Switch Request ACK message including the NH and NCC (here, NCC=3) selected form the NH and NCC value list at step 738. The eNB2 704 saves the HN and NCC=3 transmitted by the eNB gateway 706 at step 740.

Figure 8:
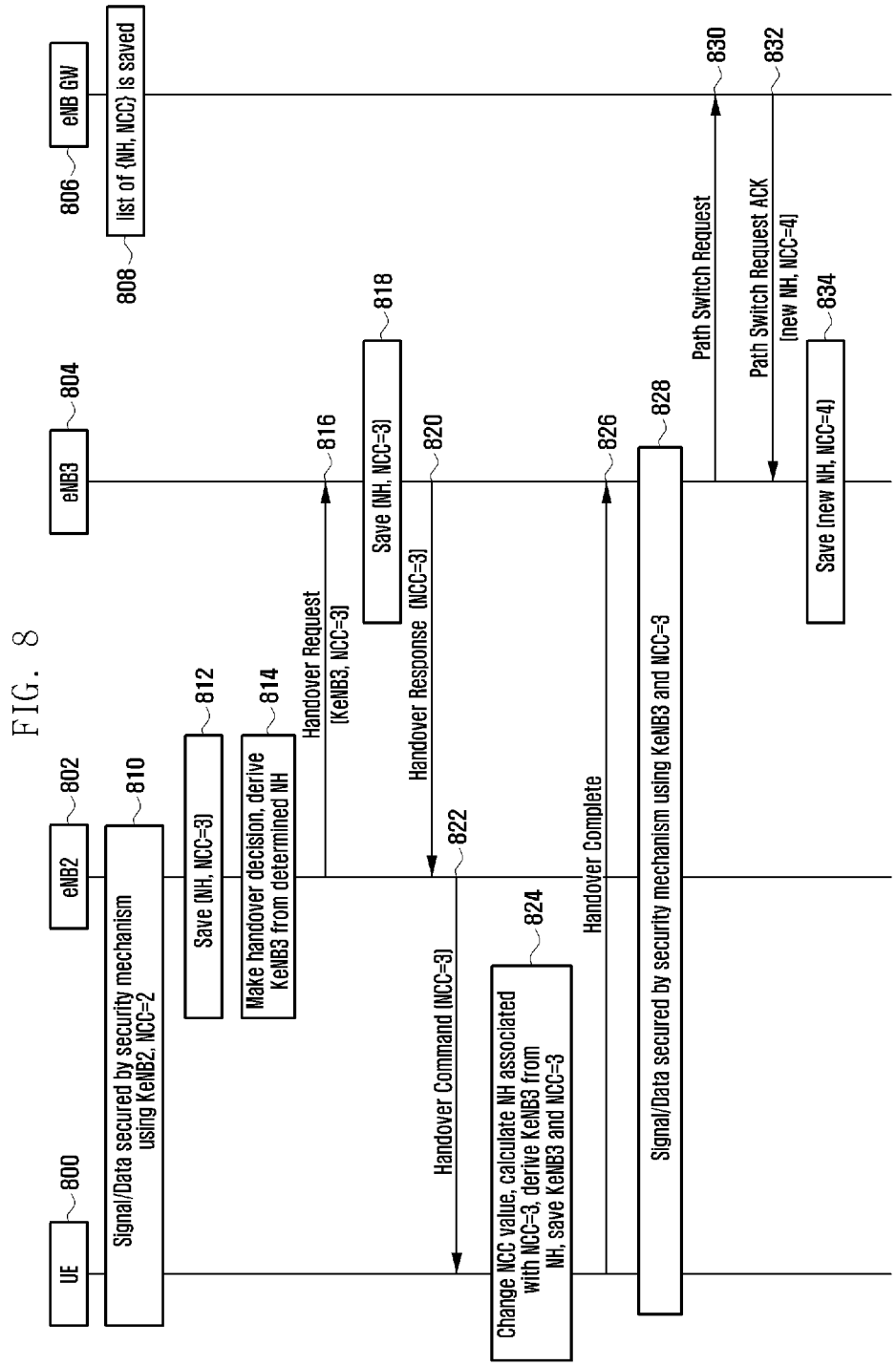
FIG. 8 is a signal flow diagram illustrating a handover procedure with the eNB gateway according to the second embodiment of the present invention.

FIG. 8 is a signal flow diagram illustrating a handover procedure with the eNB gateway according to the second embodiment of the present invention.

FIG. 8 is directed to the case where tin UE handover-related message is processed by the eNB gateway 806 without delivery to the MME in the handover occurring from an eNB 802 (hereinafter, referred to as eNB2) connected to the eNB gateway 806 to another eNB 804 (hereinafter, referred to as eNB3) connected to the eNB gateway 806.

Referring to FIG. 8, the eNB gateway 806 saves the list of NH and NCC values as the UE security information transmitted by the MME at step 808. Afterward, the UE 800 and the eNB2 802 perform secured communication using KeNB2 and NCC=2 at step 810. At this time, the eNB2 802 saves the NH and NCC=3 transmitted by the eNB gateway 806 as described with reference to step 740 of FIG. 7 at step 812.

The eNBs 802 makes a handover decision for the UE 800 according to the movement of the UE 800 at step 814. Next, the eNB2 802 selects eNB3 804 as the target eNB and then generates KeNB3 in consideration of the HN transmitted by the eNB gateway 806 and the cell information (Physical cell ID and downlink frequency information) of the eNB3 804.

The eNB2 802 sends the eNB3 804 a Handover Request message including the KeNB3 generated as the security key and the NCC=3 associated with the NH value used for generating the KeNB3 at step 816. Upon receipt of this message, the eNB3 804 saves the KeNB3 and NCC=3 included in the Handover Request message transmitted by the eNB2 802 at step 818 and sends the eNB2 802 a Handover Response message in response to the Handover Request message at step 820. At this time, the Handover Response message includes the NCC=3 transmitted by the eNB2 802. Afterward, the eNB2 802 sends a Handover Command message including the NCC=3 transmitted by the eNB3 803 at step 822.

Upon receipt of this message, the UE 800 compares the NCC value transmitted by the eNB2 802 with the previously received NCC value at step 824. If the NCC values mismatch, the UE 800 changes the NCC value. Next, the UE 800 calculates the NH value associated with the received NCC value. The UE 800 derives KeNB3 from the calculated NH value and the cell information (Physical cell ID and downlink frequency information) of the eNB3 804. Next, the UE 800 saves the generated KeNB3 value and the received NCC=3. The UE 800 sends the eNB3 804 a Handover Complete message at step 826. Afterward, the UE 800 and the eNB2 804 saves the KeNB3 as the common security key and the NCC=3 associated with the security key at step 828. Next, the UE 800 and the eNB2 804 perform the secured signaling or data transmission using the saved security key of KeNB3.

The eNB3 804 sends the eNB gateway 806 a Path Switch Request message notifying of the handover completion at step 830. Upon receipt of this message, the eNB gateway 806 sends, at step 832, the eNB3 804 a Path Switch Response message including unused HN and NCC values selected from the list of NH and NCC values that has been saved at step 808. Here, the description is made under the assumption that value transmitted to the eNB3 804 in the Path Switch Response message is 4. Upon receipt of this message, the eNB3 804 saves the NH and NCC=4 transmitted by the eNB gateway 806 at step 834.

Figure 9:
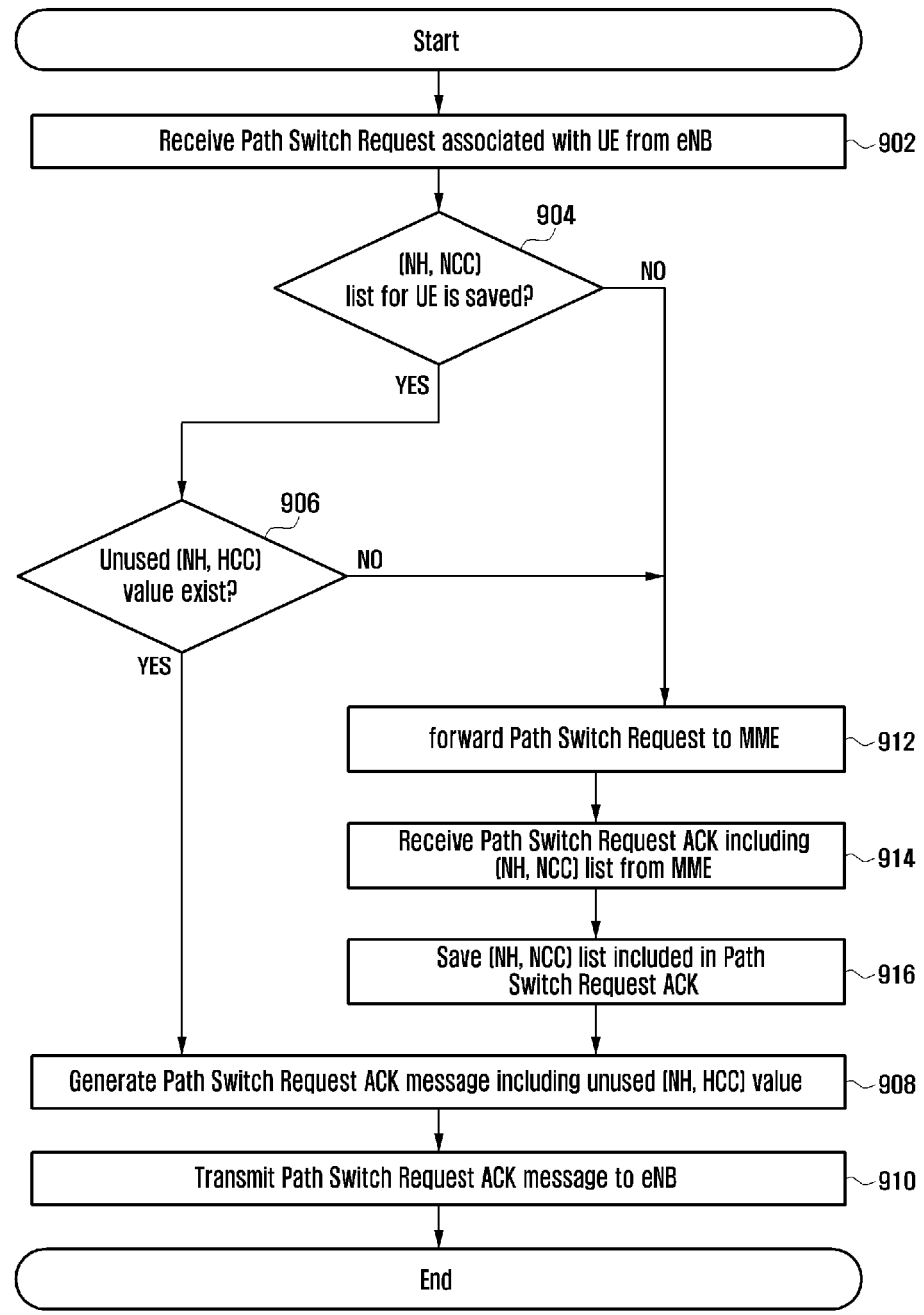
FIG. 9 is a flowchart illustrating the operating procedure of the eNB gateway according to the first and second embodiments of the present invention.

FIG. 9 is a flowchart illustrating the operating procedure of the eNB gateway according to the first and second embodiments of the present invention.

Referring to FIG. 9, the eNB gateway 902 receives a Path Switch Request message associated with a specific UE from the an eNB at step 902 and determines whether a security information (NH and NCC values) list of the UE has been saved at step 904.

If the NH and NCC value list of the UE has been saved, the eNB gateway checks whether there are unused NH and NCC values, i.e. NH and NCC values not transmitted to the eNB, in the NH and NCC list at step 906. If there are unused NH and NCC values, the eNB gateway generates a Path Switch Request ACK message including the unused NH and NCC values at step 908. Next, the eNB gateway sends the Path Switch Request ACK message to the eNB which has transmitted the Path Switch Request message at step 910.

Otherwise, if no NH and NCC value list of the UE has not been saved at step 904 or if, although the NH and NCC value list of the UE exists, there is no unused NH and NCC in the NH and NCC value list, the eNB gateway delivers the Switch Path Request message received from the eNB to the MME at step 912. The eNB gateway receives the Path Switch Request ACK message including the NH and NCC value list from the MME at step 914. Next, the eNB gateway saves the NH and NCC value list transmitted by the MME at step 916 and performs steps 908 and 910.

Figure 10:
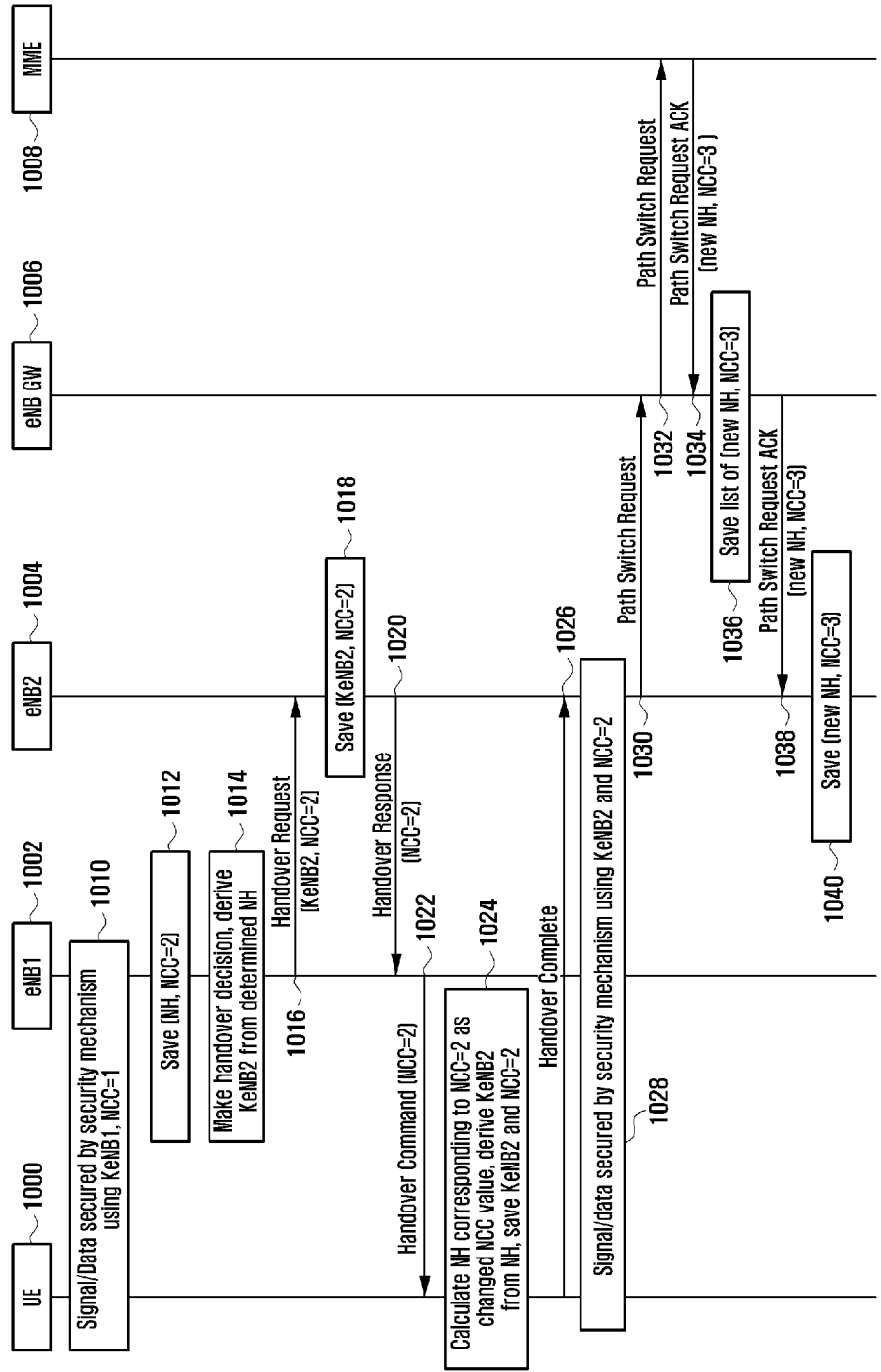
FIG. 10 is a signal flow diagram illustrating the handover procedure with the eNB gateway according to the third embodiment of the present invention.

FIG. 10 is a signal flow diagram illustrating the handover procedure with the eNB gateway according to the third embodiment of the present invention.

FIG. 10 is directed to the case where the eNB gateway 1006 saves the UE-related security information list when the handover of the UE 1000 occurs from the eNB 1002 (hereinafter, referred to as eNB1) not connected to the eNB gateway 1006 to an eNB 1004 (hereinafter, referred to as eNB2) connected to the eNB gateway 1006.

Referring to FIG. 10, the UE 1000 and eNB1 1002 are performing secured communication using KeNB1 and NCC=1 at step 1010. The eNB1 1002 saves, at step 1012, the NH and NCC values transmitted by the eNB gateway as described with reference to step 236 of FIG. 2 and step 418 of FIG. 4. Here, the description is made under the assumption that the NCC transmitted by the eNB gateway is set to 2.

The eNB1 1002 makes a handover decision for the UE 1000 according to the location change of the UE 1000 at step 1014. At this time, the eNB1 1002 determines the eNB2 1004 as the target eNB and generates KeNB2 in consideration of the save NH value and the cell information (Physical cell ID and downlink frequency information) of the eNB2 1004. The eNB1 1002 sends the eNB2 1004 a handover request message including the KeNB2 as the newly generated security key and the NCC value associated with the NH value used for generating the KeNB2 at step 1016. Here, the description is made under the assumption that NCC value is set to 2.

The eNB2 1004 saves the KeNB2 and NCC values transmitted by the eNB1 1002 at step 1018. Next, the eNB2 1004 sends the eNB1 1002 a Handover Response message including NCC=2 in response to the Handover Request message at step 1020. Afterward, the eNB1 1002 sends the UE 1000 the Handover Command message including NCC=2 transmitted by the eNB2 1004 at step 1022.

The UE 1000 compares the NCC value included in the Handover Command message transmitted by the eNB1 1002 with the previously stored NCC value at step 1024. If the NCC values mismatch, the UE 1000 calculates NH value associated with the NCC value transmitted by the eNB2 1004. Afterward, the UE 1000 generates KeNB2 in consideration of the calculated NH value and the cell information (Physical cell ID and downlink frequency information) of the eNB2 1004. Next, the UE 1000 saves the generated KeNB2 value and NCC=2 transmitted by the eNB1 1002.

The UE 1000 sends the eNB2 1004 a Handover Complete message at step 1026. At this time, the UE 1000 and the eNB2 1004 save the KeNB2 as the common security key and NCC=2 associated with the security key at step 1028. Afterward, the UE 1000 and the eNB2 1004 perform signal or data transmission communication secured by the security mechanism with the KeNB2 and NCC=2 associated with the security key. Next, the eNB2 1004 sends the eNB gateway 1006 a Path Switch Request message notifying the handover completion at step 1030.

Next, the eNB gateway 1006 forwards the Path Switch Request message to the MME 1008 at step 1032. The MME 1008 sends the eNB gateway 1006 a Path Switch Request ACK message including the new NH as the UE security information and the NCC value associated with the NH at step 1034. Here, the description is made under the assumption that the NCC value is set to 3. The eNB gateway 1006 saves the NH and NCC=3 transmitted by MME 1008 at step 1036. The eNB gateway 1006 sends the eNB2 1004 a Path Switch Request ACK message including the saved NH and NCC=3 at step 1038. The eNB2 1004 saves the NH and NCC=3 transmitted by the eNB gateway 1006 at step 1040.

Figure 11:
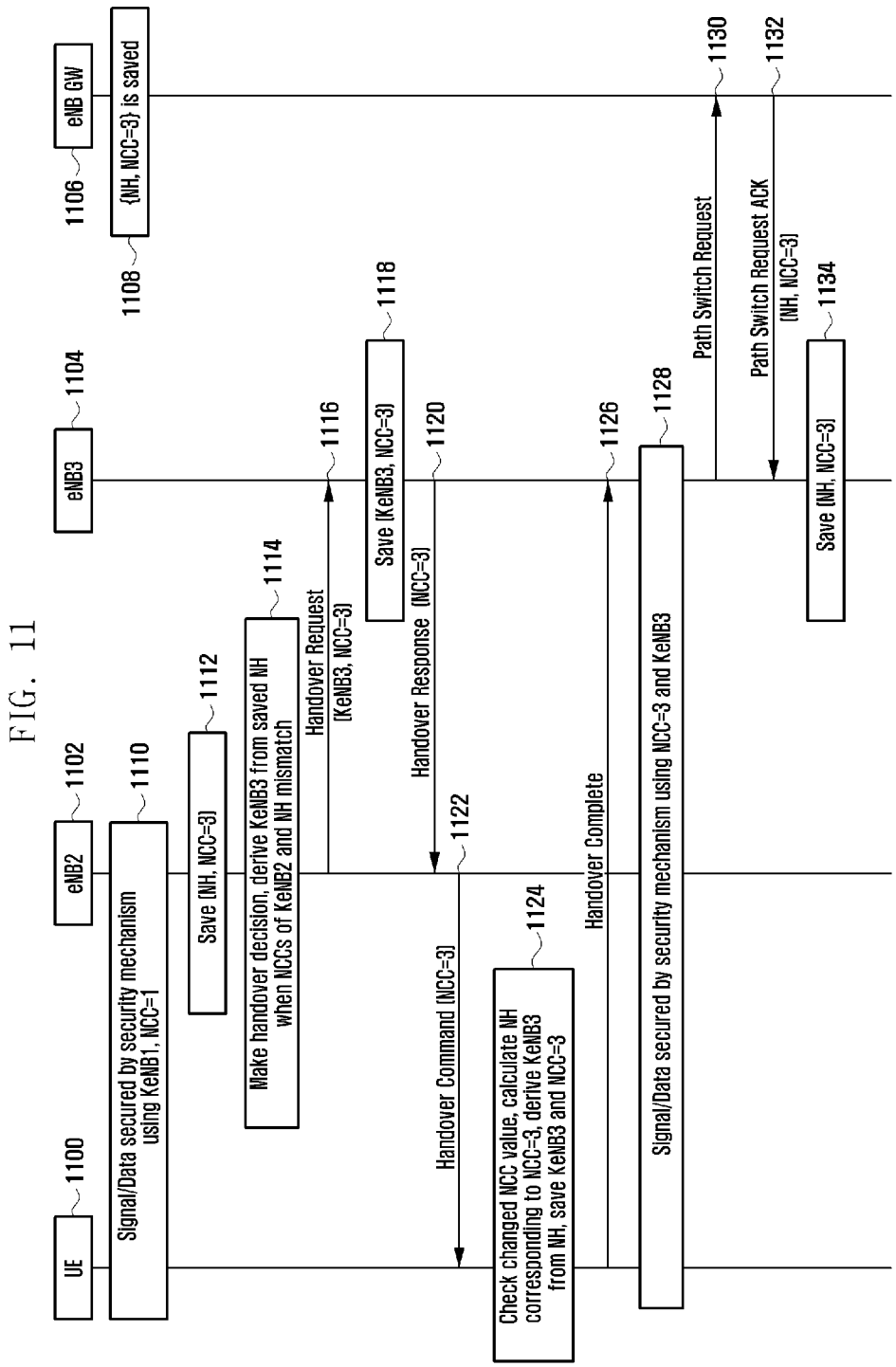
FIG. 11 is a signal flow diagram illustrating the handover procedure with the eNB gateway according to the fourth embodiment of the present invention.

FIG. 11 is a signal flow diagram illustrating the handover procedure with the eNB gateway according to the fourth embodiment of the present invention.

FIG. 11 is directed to the case where the eNB gateway 604 processes the UE handover-related messages without delivering to the MME 600 when the NCC value associated with the KeNB2 value as the security key used between the eNB2 1102 and the UE 1110 mismatches the NCC value associated with the NH value saved in the eNB2 1102 in the handover of the UE 1100 from the source eNB 1102 (hereinafter, referred to as eNB2) connected to the eNB gateway 1106 to another eNB 608 or 1104 (hereinafter, referred to as eNB3) not connected to the eNB gateway 604.

Referring to FIG. 11, the eNB gateway 1106 saves the NH value and NCC=3 as the UE security information at step 1108. The UE 1100 and the eNB2 11102 perform security communication using the KeNB2 at step 1110. At this time, the UE 1100 and the eNB2 1102 save the NH and NCC=3 at step 1112. The eNB2 1102 makes a handover decision for the UE 1100 at step 1114. In more detail, the eNB2 1102 selects the eNB3 1104 as the target eNB and then compares the NCC=3 associated with the saved NH value with the NCC=2 used in the security communication with the UE 1100.

As a result of the comparison, since the two NCC values mismatch, the eNB2 1102 generates KeNB3 in consideration of the saved NH value and the cell information (Physical cell ID and downlink frequency information) of the eNB3 1104. The eNB2 1102 sends the eNB3 1104 a Handover Request message including the KeNB3 as the newly generated security key and the NCC=3 associated with the NH value used for generating the KeNB3 at step 1116.

Upon receipt of this message, the eNB3 1104 saves the KeNB3 and NCC=3 transmitted by the eNB2 1102 at step 1118. The eNB 3 1104 sends the eNB2 1102 a Handover Response message including NCC=3 in response to the Handover Request message at step 1120. The eNB2 1102 sends the UE 1100 a Handover Command message including NCC=3 transmitted by the eNB3 1104 at step 1122.

The UE 1100 compares NCC=3 transmitted by the eNB2 1102 with NCC=2 which has been saved previously at step 1124. If the NCC values mismatch, the UE calculates the NH associated with the NCC=3 transmitted by the eNB2 1102. Afterward, the UE 1100 derives KeNB3 in consideration of the calculated NH value and the cell information (Physical cell ID and downlink frequency information) of the eNB3 1104 and saves the derived KeNB3 and NCC=3.

Next, the UE 1100 sends the eNB3 1104 a Handover Complete message at step 1126. Next, the UE 1100 and the eNB3 1104 save the KeNB3 as the common security key and NCC=3 associated with the security key. The UE 1100 and the eNB3 1104 perform secured signaling or data communication with each other using the KeNB3 and NCC=3.

The eNB3 1104 sends the eNB gateway 1106 a Path Switch Request message notifying of the completion of the handover at step 1130. The eNB gateway 1106 sends the eNB3 1104 a Path Switch Request ACK message including the previously saved NH and NCC values at step 1132. Here, the description is made under the assumption that the NCC value is 3. Next, the eNB 3 1104 saves the NH and NCC values transmitted by the eNB gateway 1106 at step 1134.

Figure 12:
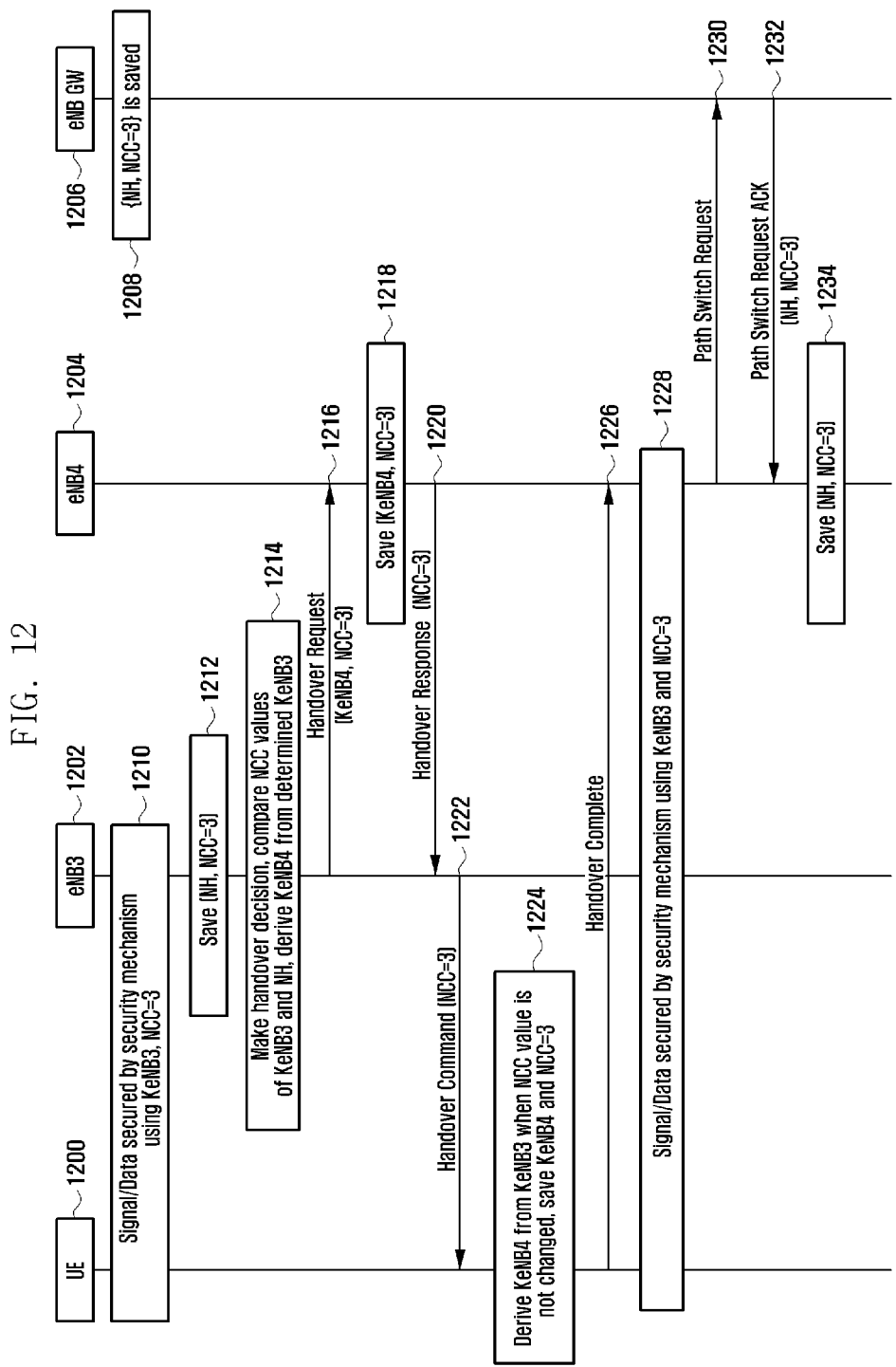
FIG. 12 is a signal flow diagram illustrating the handover procedure with the eNB gateway according to the fifth embodiment of the present invention.

FIG. 12 is a signal flow diagram illustrating the handover procedure with the eNB gateway according to the fifth embodiment of the present invention.

FIG. 12 is directed to the case where the eNB gateway 1206 processes the UE handover-related messages without delivering to the MME when the NCC value associated with the KeNB3 as the security key in use for the security communication with the eNB 1210 matches the NCC value associated with the saved NH value saved in the eNB3 1202 in the handover of the UE 1200 from the source eNB 1202 (hereinafter, referred to as eNB3) connected to the eNB gateway 1206 to another eNB 1204 (hereinafter, referred to as eNB4) connected to the eNB gateway 1206.

Referring to FIG. 12, the eNB gateway 120 has the NH value and NCC value as UE security information at step 1208. Here, the description is made under the assumption that the NCC value is 3. The UE 1200 and the eNB3 1202 are performing security communication using KeNB3 and NCC=3 at step 1210. The eNB3 1202 saves the NH and NCC=3 at step 1212. The eNB3 1202 makes a handover decision for the UE 1200 at step 1214. In more detail, the eNB3 1202 selects the eNB4 1204 as the target eNB and compares the NCC value associated with the previously saved NH value with the NCC value in use for security communication with the UE 1200.

If the two NCC values match, the eNB 1202 derives KeNB4 in consideration of the KeNB3 value in used for the security communication with the current UE 1200 and the cell information (Physical cell ID and downlink frequency information) of the eNB4 1204. The eNB3 1202 sends the eNB4 1204 a Handover Request message including NCC=3 associated with the KeNB3 used for generating the KeNB4 at step 1216.

The eNB4 1204 saves the KeNB4 and NCC value transmitted by the eNB3 1202 at step 1218. Next, the eNB4 1204 sends the eNB3 1202 a Handover Response message including NCC value set to 3 in response to the Handover Request message at step 1220. Upon receipt of the Handover Response message, the eNB3 1202 sends the UE 1200 a Handover Command message including the NCC value transmitted by the eNB4 1204 at step 1222. The UE 1200 compares the NCC value transmitted by the eNB3 1202 with the saved NCC value at step 1224.

If the NCC values match, the UE 1200 generates KeNB4 in consideration of KeNB3 value as the security key in use for security communication with the eNB3 1202 and the cell information (Physical cell ID and downlink frequency information) of the eNB4 1204. Next, the UE 1200 saves the generated KeNB4 and the NCC=3 associated with the security key of KeNB4 in use currently. The UE 1200 sends the eNB4 1204 a Handover Complete message at step 1226. At this time, the UE 1200 and the eNB4 1204 save the KeNB4 as the common security key and the NCC=3 associated with the security at step 1228. Next, the UE 1200 and the eNB4 1204 perform secured signaling or data communication using the saved KeNB4 and NCC.

Next, the eNB4 1204 sends the eNB gateway 1206 a Path Switch Request message notifying the completion of the handover at step 1230. Upon receipt of this message, the eNB gateway 1206 sends the eNB4 1204 a Path Switch Request ACK message including the saved NH and NCC values at step 1232. Here, the description is made under the assumption that the NCC value is 3. The eNB4 1204 saves the HN and NCC values transmitted by the eNB gateway 1206 at step 1234. Even at this time, the NCC value is 3.

Figure 13:
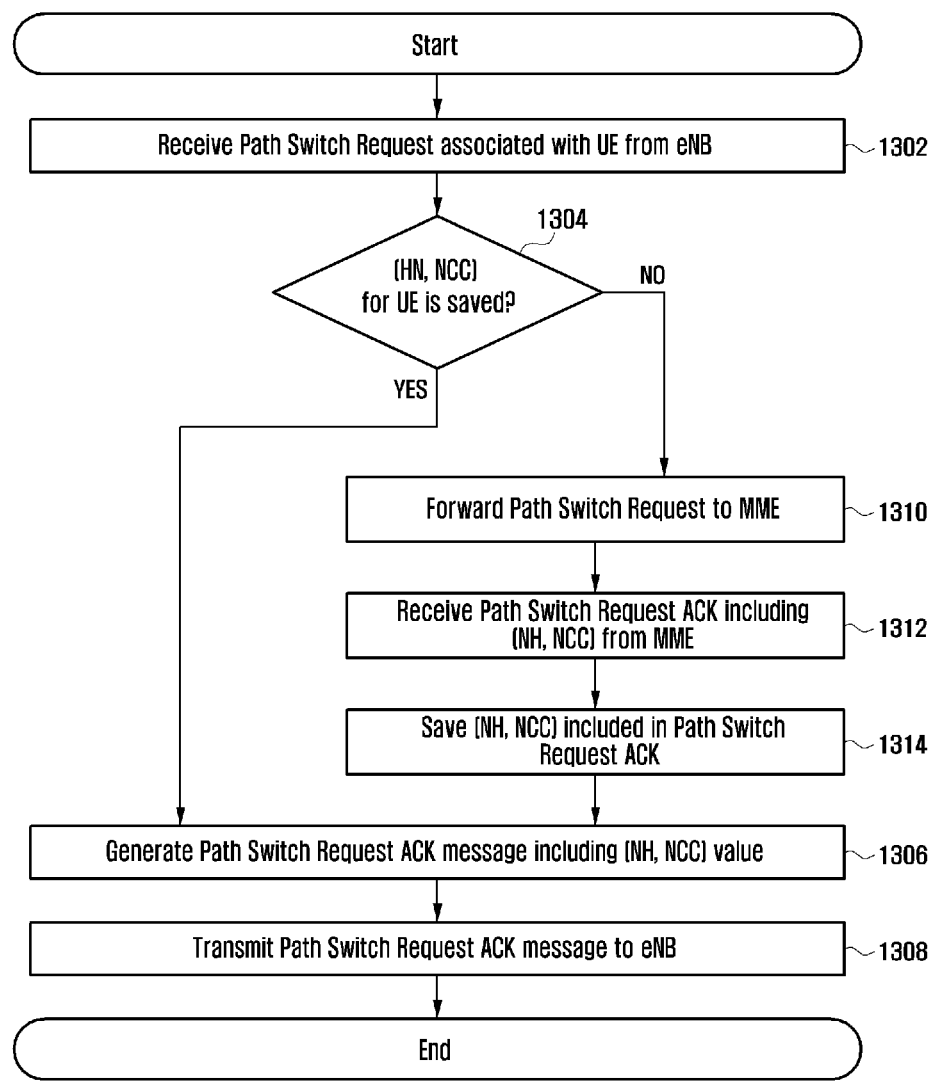
FIG. 13 is a flowchart illustrating the operating procedure of the eNB gateway according to the third to fifth embodiments of the present invention.

FIG. 13 is a flowchart illustrating the operating procedure of the eNB gateway according to the third to fifth embodiments of the present invention.

Referring to FIG. 13, the eNB gateway receives a Path Switch Request message associated with a specific UE from an eNB at step 1302 and checks whether the NH and NCC values for the UE have been saved at step 1304. If the NH and NCC values for the UE have been saved, the eNB gateway generates a Path Switch Request ACK message including the NH and NCC values at step 1306. The eNB gateway sends the generated Path Switch Request ACK message to the eNB which has transmitted the Path Switch Request message at step 1308.

Otherwise, if the NH and NCC values for the UE have not been saved, the eNB gateway sends the MME the Path Switch Request message transmitted by the eNB at step 1310. The eNB gateway receives the Path Switch Request ACK message including the NH and NCC which is transmitted by the MME at step 1312, saves the NH and NCC values transmitted by the MME at step 1314, and performs steps 1306 and 1308.

Figure 14:
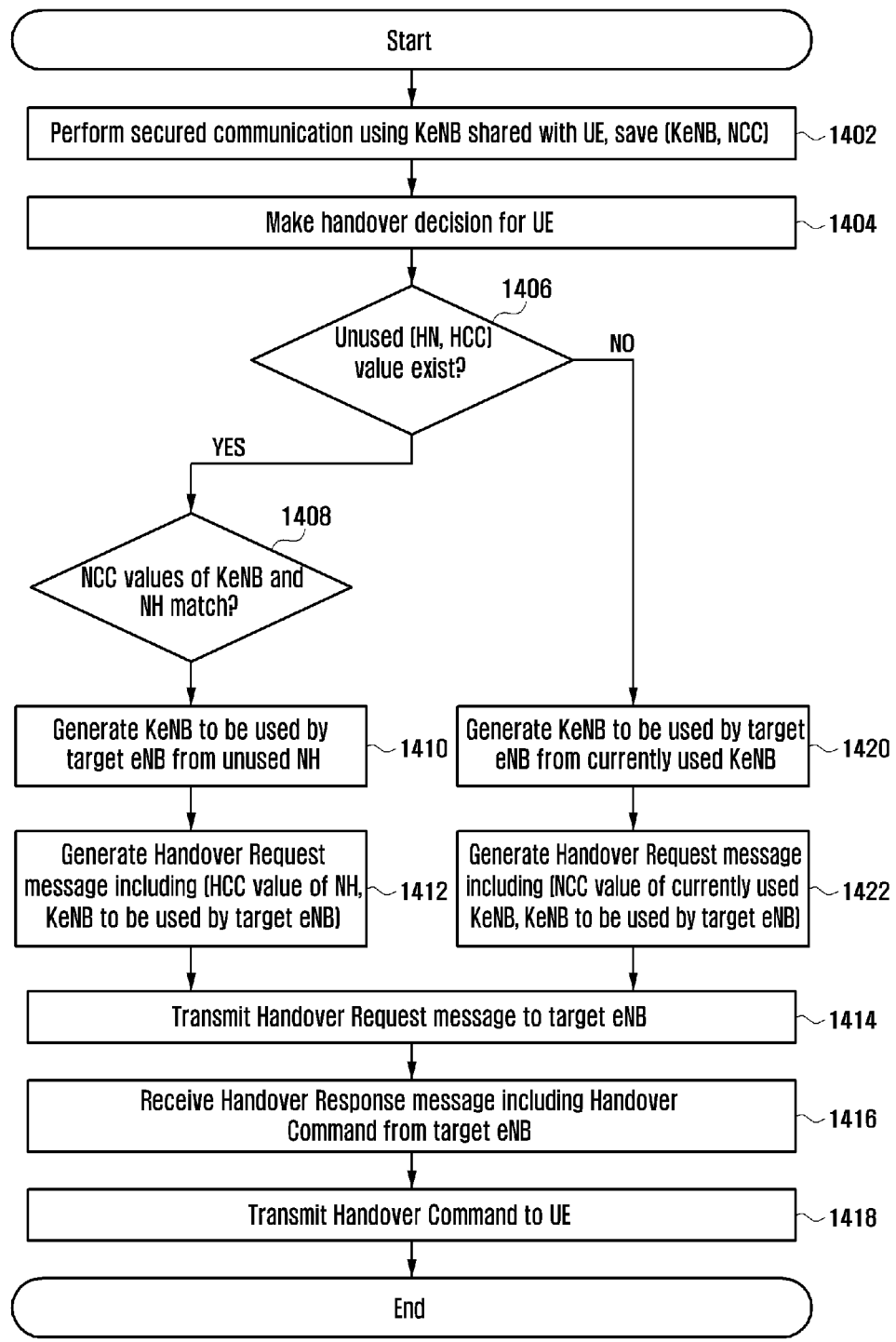
FIG. 14 is a flowchart illustrating the operating procedure of the source eNB according to the third to fifth embodiment of the present invention.

FIG. 14 is a flowchart illustrating the operating procedure of the source eNB according to the third to fifth embodiment of the present invention.

Referring to FIG. 14, the source eNB is performing secured communication using the KeNB as the security key shared with the UE at step 1402. At this time, the source eNB saves the KeNB in use for security communication and the NCC value associated with the KeNB. Next, the source eNB makes a handover decision for the UE according to the movement of the UE at step 1404. The source eNB checks whether there are unused NH and NCC values among the saved NH and NCC values at step 1406.

If there are unused NH and NCC values, the source eNB compares the NCC value associated with the KeNB in use currently with the NCC value associated with the checked NH at step 1408. If the two values mismatch, the source eNB generates the security key of KeNB to be used in the target eNB in consideration of the unused NH value and the cell information (Physical cell ID and downlink frequency information) of the target eNB.

Next, the source eNB generates a Handover Request message including the NCC value associated with the NH value used for generating the security key of KeNB and the generated KeNB value. The source eNB sends the Handover Request message to the target eNB at step 1414. Next, the source eNB receives a Handover Response message including a Handover Command message addressed to the UE from the target eNB at step 1416. The source eNB sends the Handover Command message transmitted by the target eNB to the UE at step 1418.

Otherwise, if there are no unused NH and NCC values at step 1406 or if the NCC value associated with the KeNB in use currently matches the NCC value associated with the checked NH at step 1408, the source eNB generates KeNB to be used by the target eNB in consideration of the KeNB in use currently and the cell information (Physical cell ID and downlink frequency information) of the target eNB at step 1420. The source eNB generates a Handover Request message including the NCC value associated with the KeNB in use currently and the newly generated KeNB value of the target eNB and then performs steps 1414 to 1418.

Figure 15:
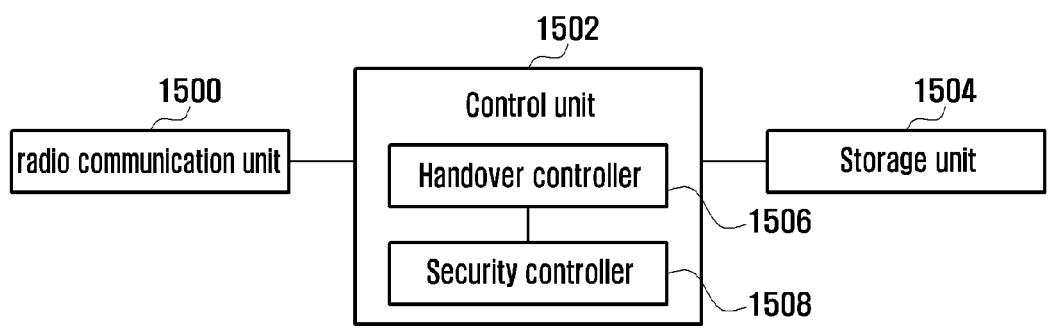
FIG. 15 is a block diagram illustrating the configuration of the source eNB according to an embodiment of the present invention.

FIG. 15 is a block diagram illustrating the configuration of the source eNB according to an embodiment of the present invention.

Referring to FIG. 15, the source eNB includes a radio communication unit 1500, a control unit 1502, and a storage unit 1504.

The radio communication unit 1500 is capable of perform secured communication and transmits a handover request message to the target eNB in a handover of the UE under the control of the control unit. The radio communication unit 1500 is also capable of receiving the security key and the NH and NCC values as the UE security information that are transmitted by the eNB gateway. The radio communication unit 1500 is also capable of receiving the Handover Response message transmitted by the target eNB and transmitting the Handover Command message to the UE for performing handover.

The control unit 1502 controls overall operations and conditions of the components constituting the source eNB. In the case of handover of the UE performing security communication, the control unit 1502 is capable of controlling the handover of the UE through the eNB gateway. In order to accomplish this, the control unit 1502 includes a handover controller 1506 and a security controller 1508.

The handover controller 1506 determines whether to make a handover decision according to the change of the UE location. If the Handover Response message is received from the target eNB through the radio communication unit 1500, the handover controller 1506 controls to transmit the NCC value as the UE security information included in the Handover Response message to the UE.

The security controller 1508 controls security communication with the UE using KeNB as the security key. If the handover controller 1506 makes a handover decision, the security controller 1508 generates KeNB to be used by the target eNB using the eNB information of the target eNB and the NCC value or the KeNB for secured communication with the current UE.

The storage unit 1504 stores the data and information generated by the source eNB. Here, the storage unit 1504 stores the KeNB as the security key for the security communication with the UE and the NH and NCC values as the UE security information. If the NCC value is received from the eNB gateway, the storage unit 1504 updates the stored NCC value with the received NCC value under the control of the control unit 1502.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A handover management method of a base station gateway processing signals between a mobility management entity and base stations, the handover management method comprising:
checking, when a Path Switch Request message associated with a terminal is received from a base station, whether a list of terminal security information values which has been saved exists;
generating, when the list exists, a Path Switch Request acknowledge message including an unused terminal security information value selected from the list; and
transmitting the Path Switch Request acknowledge message to the base station.

2. The handover management method of claim 1, wherein generating comprises:
forwarding, when no list exists, the Path Switch Request message to the mobility management entity; and
receiving the list from the mobility management entity.

3. The handover management method of claim 2, wherein forwarding comprises sending, when no unused terminal security information value exists in the list, the Path Switch Request message to the mobility management entity.

4. A handover method of a base station, the handover method comprising:
receiving a handover complete message from a terminal;
transmitting a path switch request message to request for sending the handover complete message and data addressed to the terminal to the base station, from the base station to a base station gateway; and
receiving a path switch request acknowledge message including an unused terminal security information value selected from a list of terminal security information values which has been saved.

5. The handover method of claim 4, further comprising:
saving the unused terminal security information value.

6. A base station gateway processing signals between a mobility management entity and base stations, the base station gateway comprising:
a radio communication unit configured to communicate with a mobility management entity or a base station; and
a control unit configured to check whether a list of terminal security information values which has been saved exists when a Path Switch Request message associated with a terminal is received from the base station, generate a Path Switch Request acknowledge message including an unused terminal security information value selected from the list when the list exists, and transmit the Path Switch Request acknowledge message to the base station.

7. The base station gateway of claim 6, wherein the control unit is configured to:
forward, when the list does not exist, the Path Switch Request message to the mobility management entity; and
receive the list from the mobility management entity.

8. The base station gateway of claim 7, wherein the control unit is further configured to send, when an unused terminal security information value does not exist in the list, the Path Switch Request message to the mobility management entity.

9. A base station for performing a handover, the base station comprising:
a radio communication unit configured to communicate with a mobility management entity or a base station; and
a control unit configured to receive a handover complete message from the terminal, transmit a path switch request message, to request for sending the handover complete message and data addressed to the terminal to the base station, from the base station to a base station gateway, and receive a path switch request acknowledge message including an unused terminal security information value selected from a list of terminal security information values which has been saved exists.

10. The base station of claim 9, further comprising:
a storage unit configured to save the unused terminal security information value.

* * * * *